Oct. 1, 1968  J. L. GARTIN  3,403,606
CARTON FEEDING AND FORMING APPARATUS
Filed July 8, 1966  12 Sheets-Sheet 1
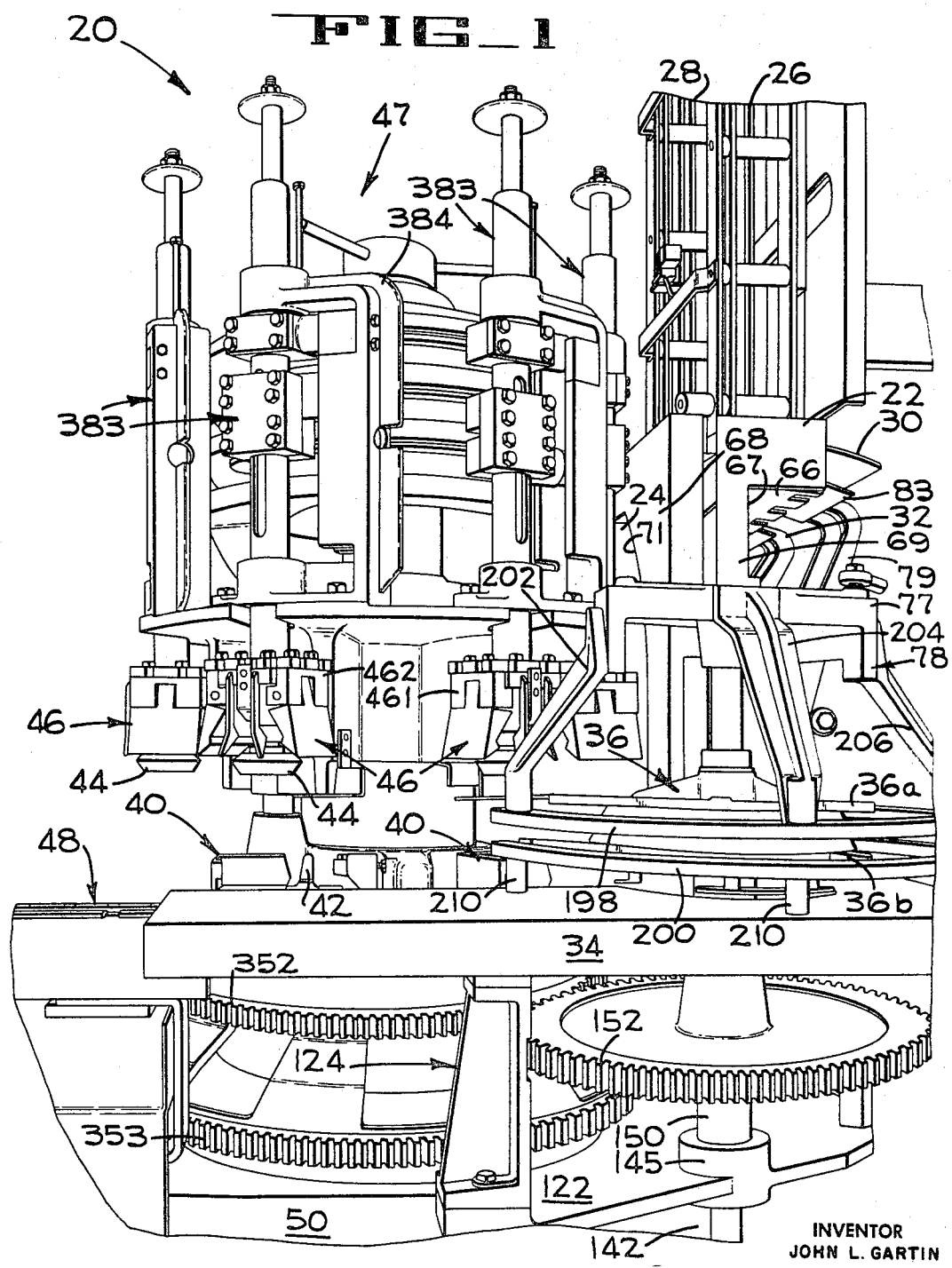
INVENTOR
JOHN L. GARTIN
BY Francis W. Anderson
ATTORNEY

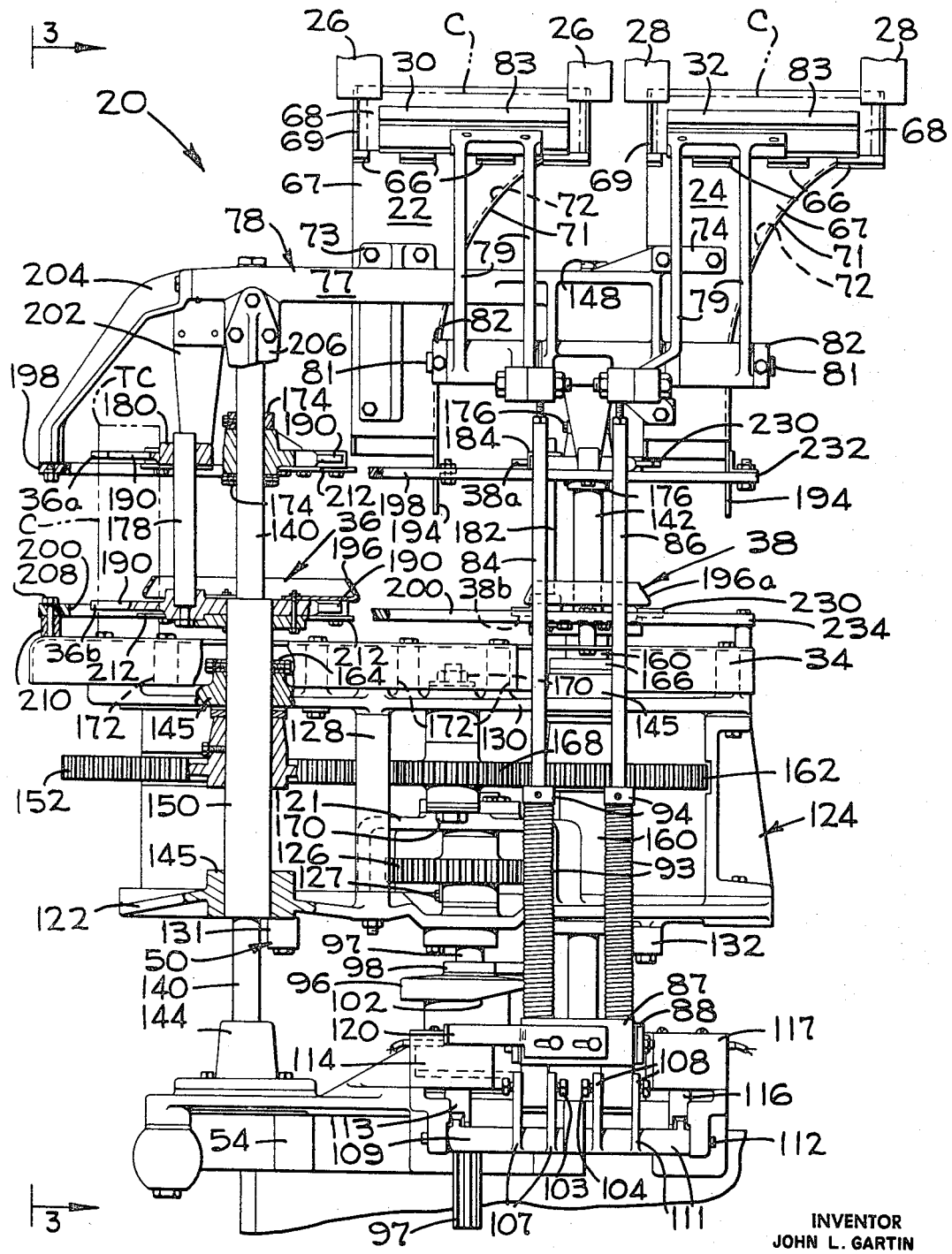

Oct. 1, 1968  J. L. GARTIN  3,403,606
CARTON FEEDING AND FORMING APPARATUS
Filed July 8, 1966  12 Sheets-Sheet 3
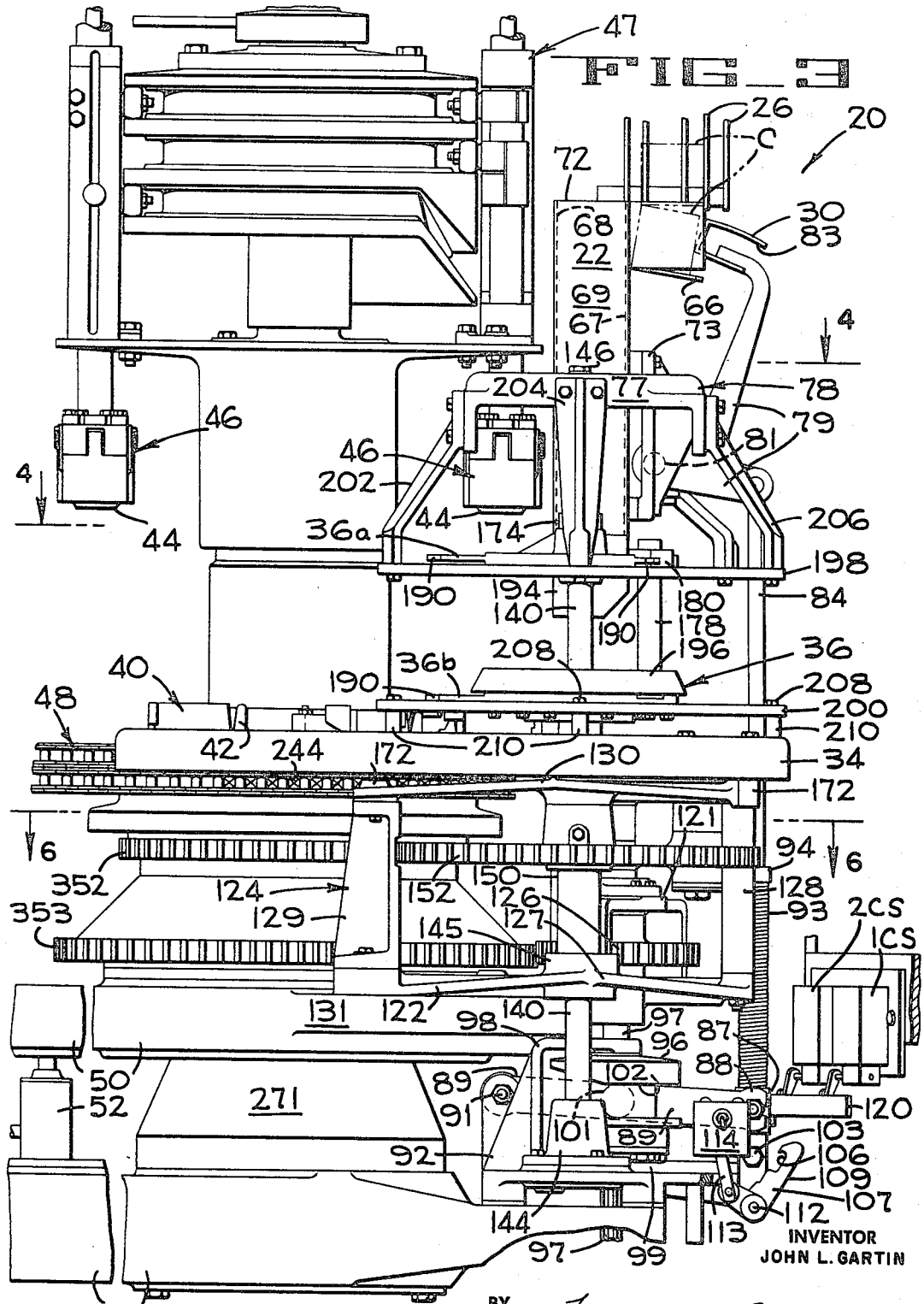
INVENTOR
JOHN L. GARTIN
BY *Francis W. Anderson*
ATTORNEY

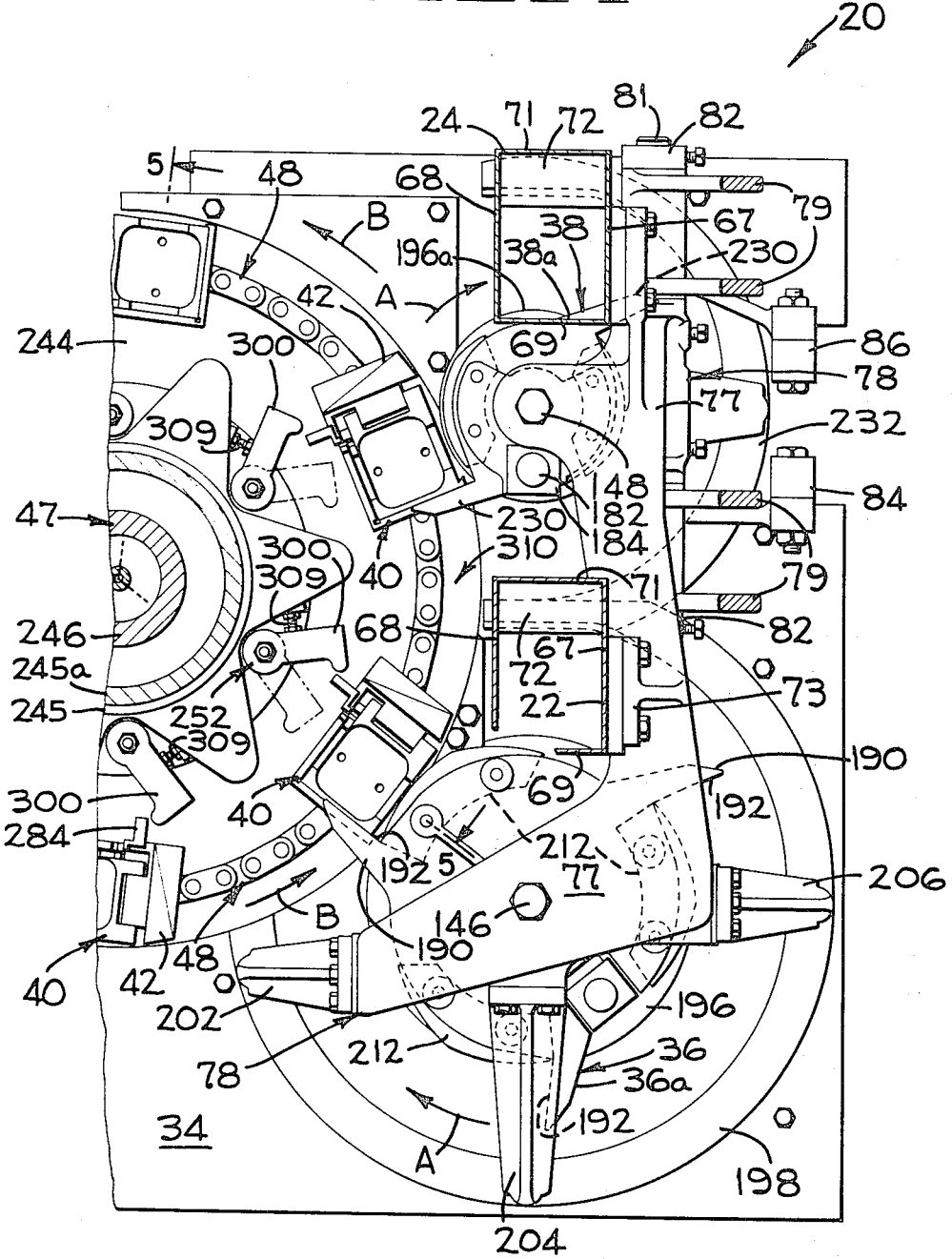

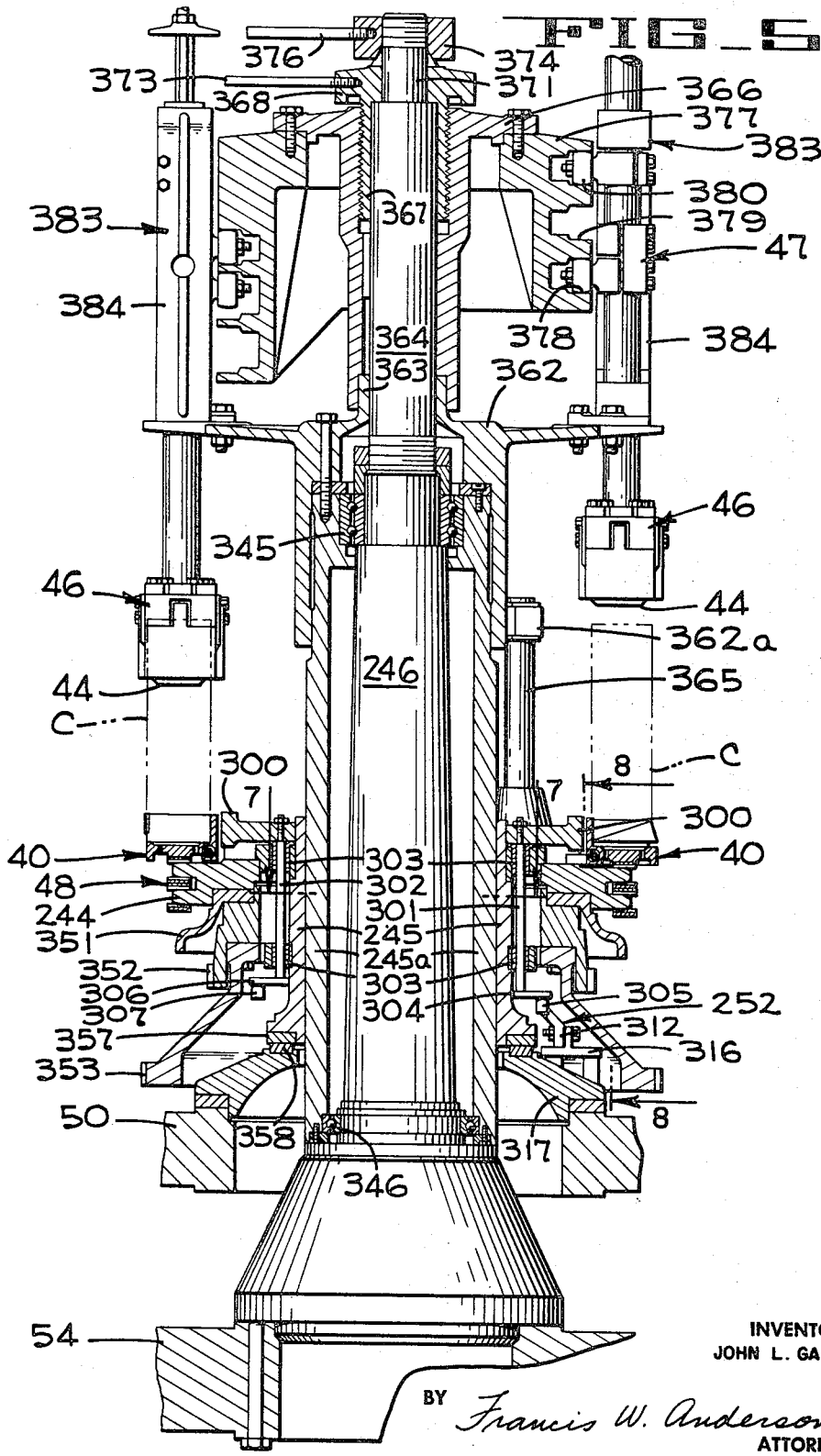

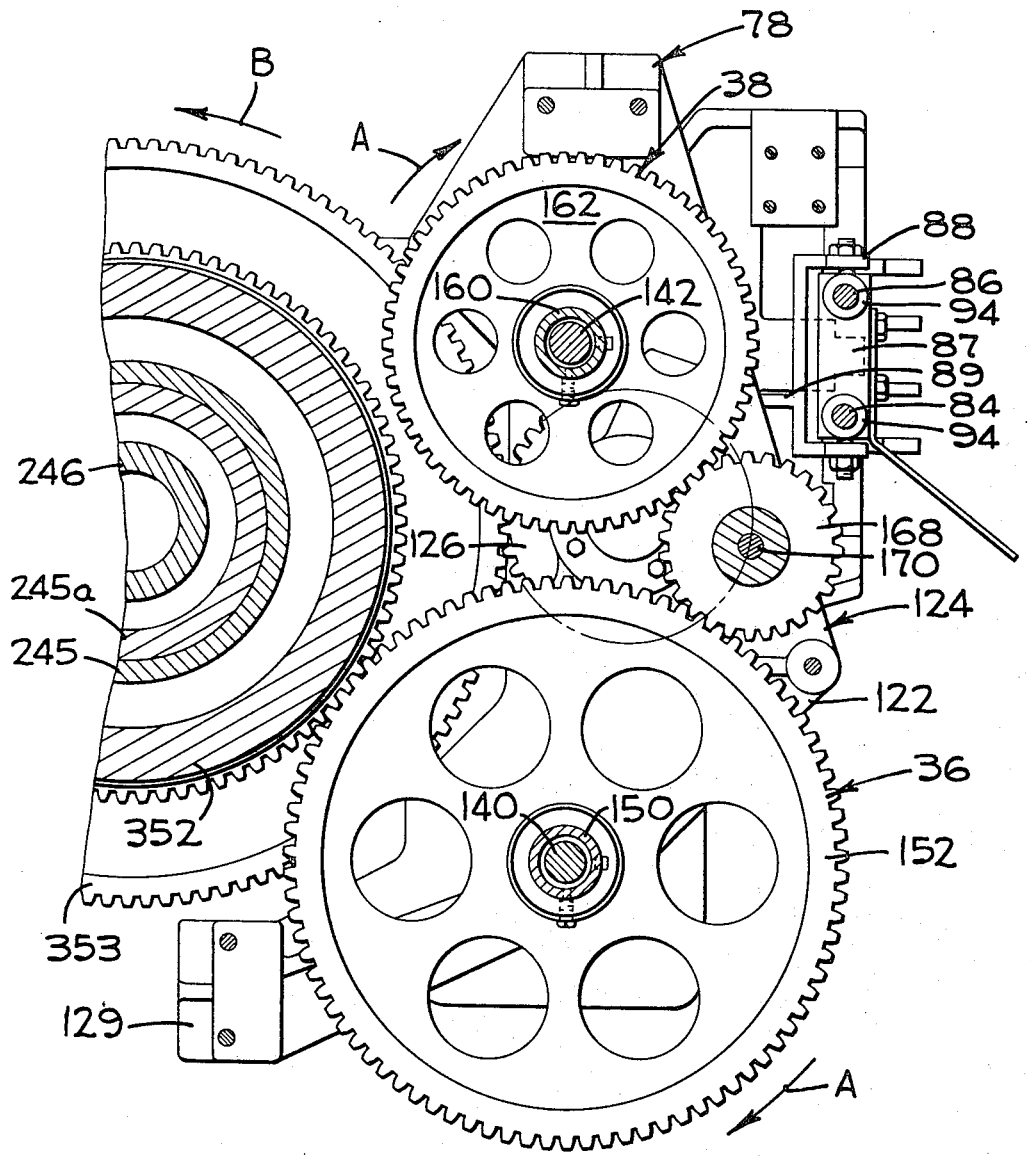

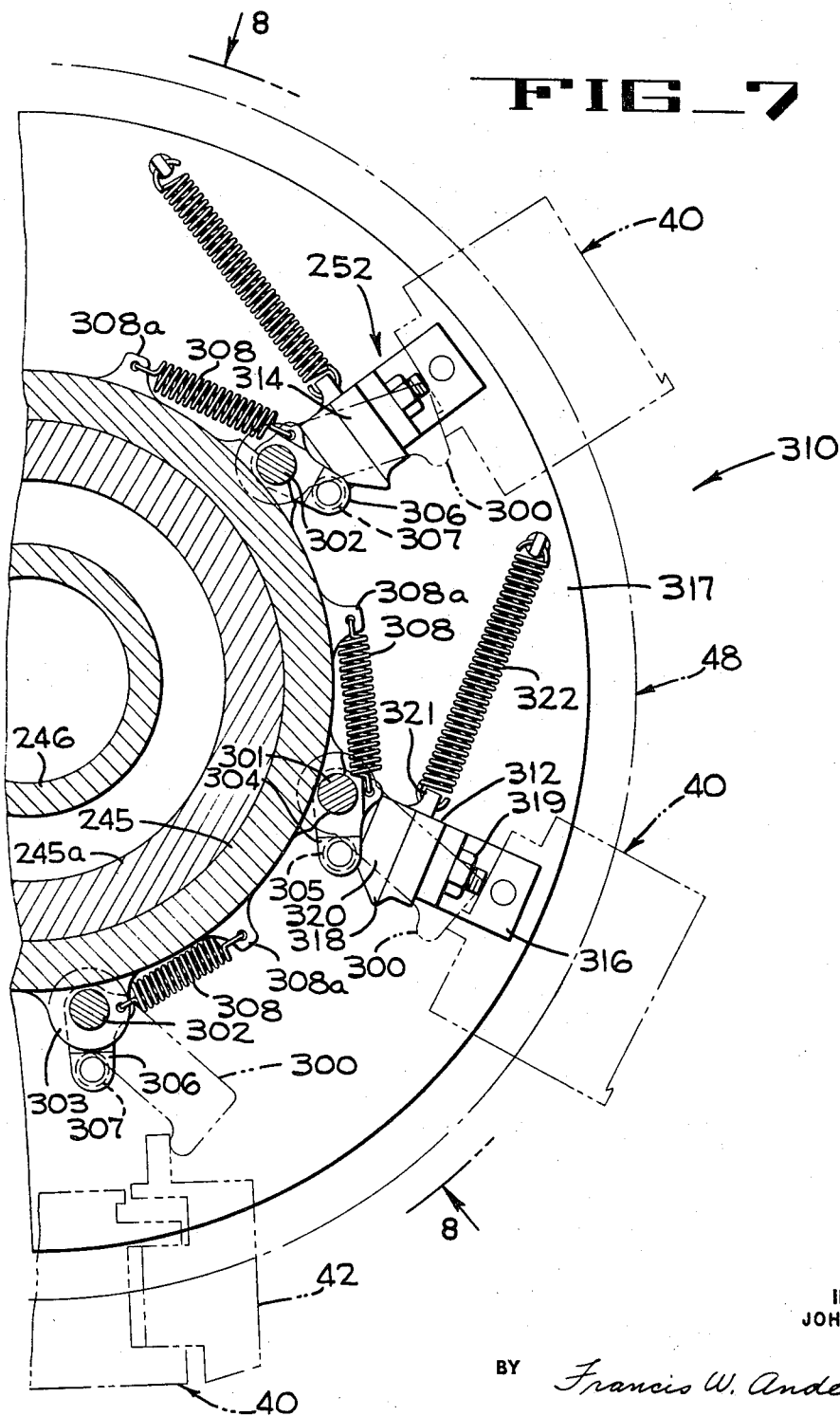

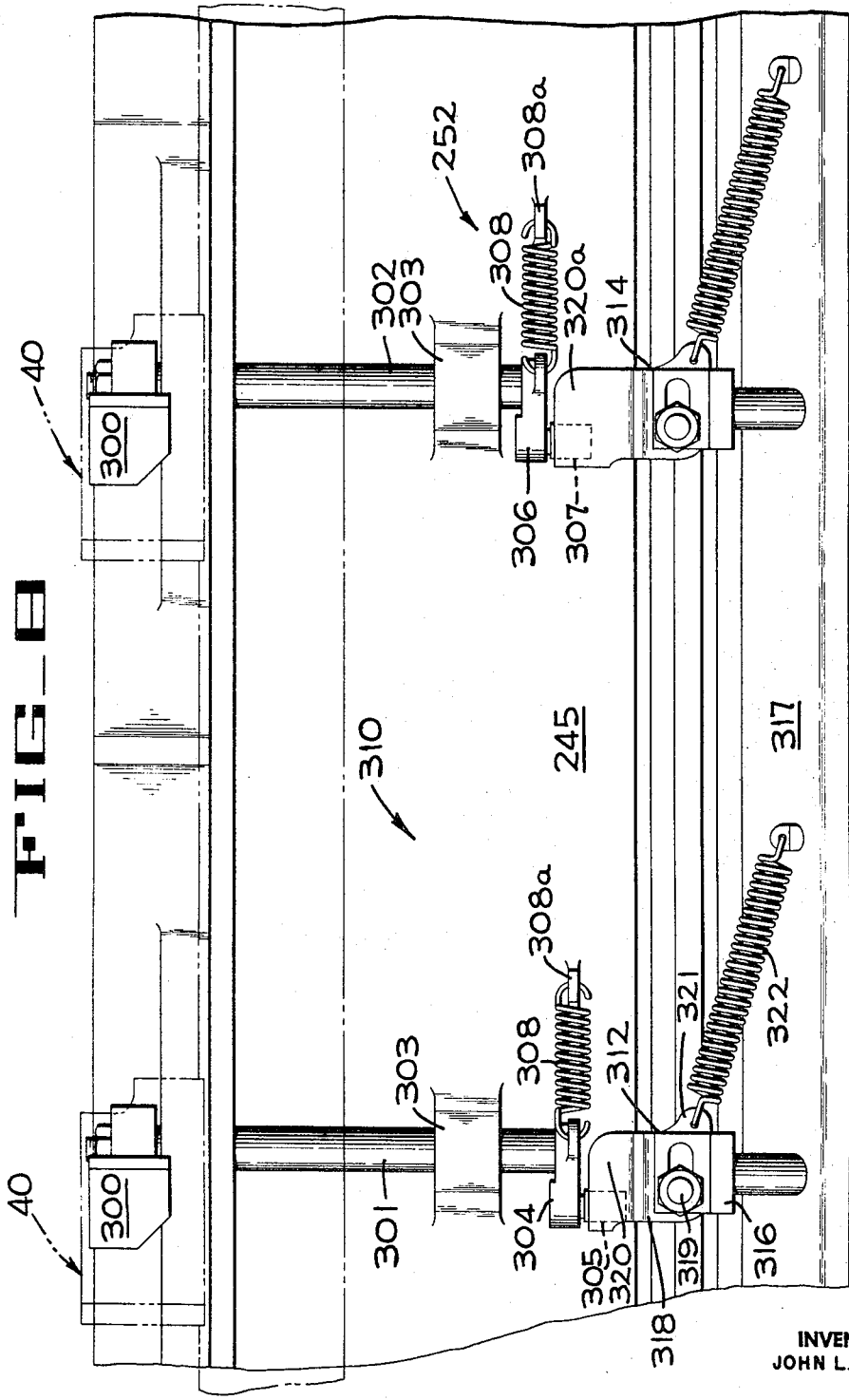

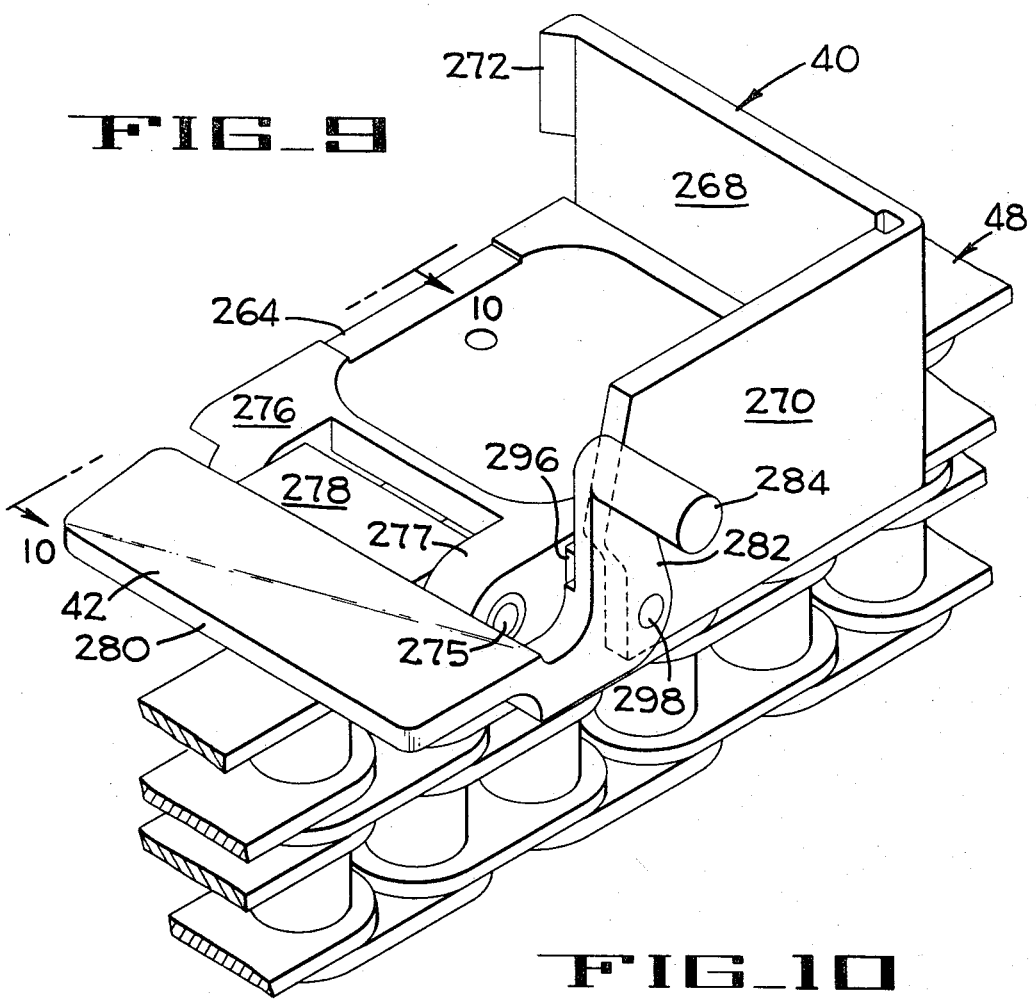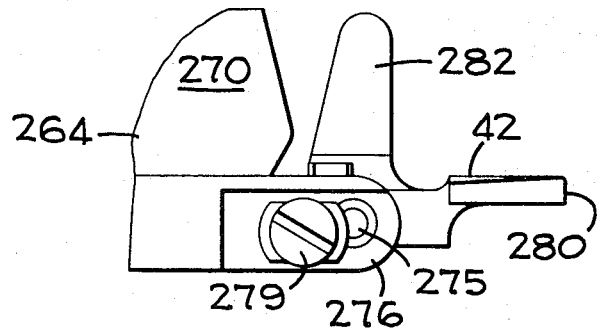

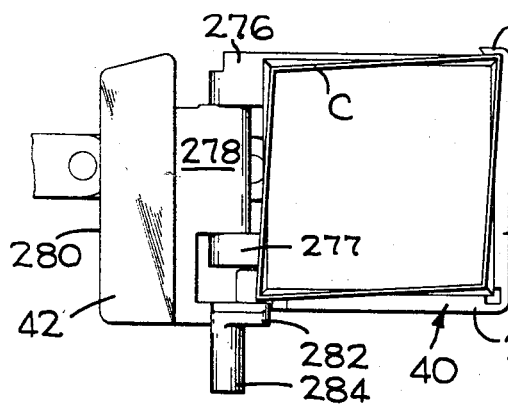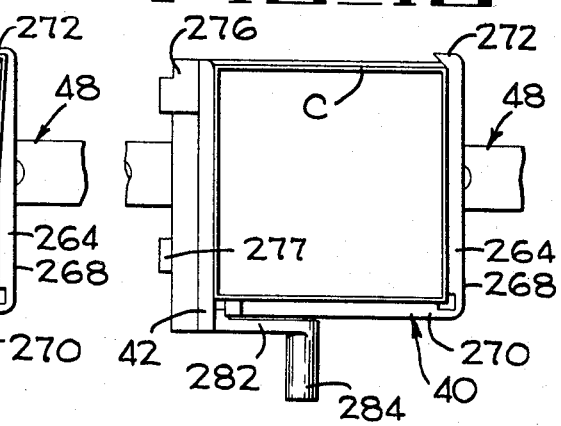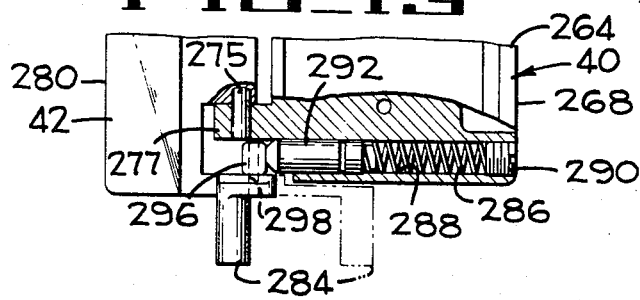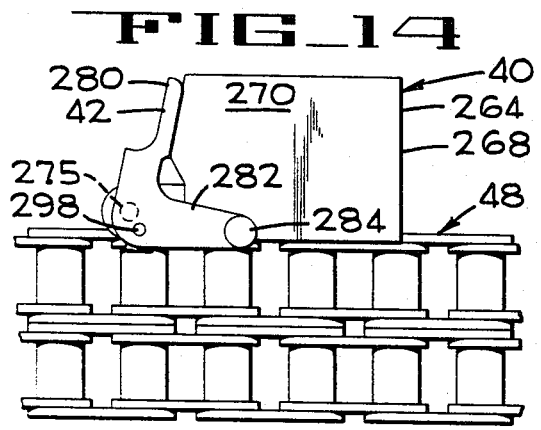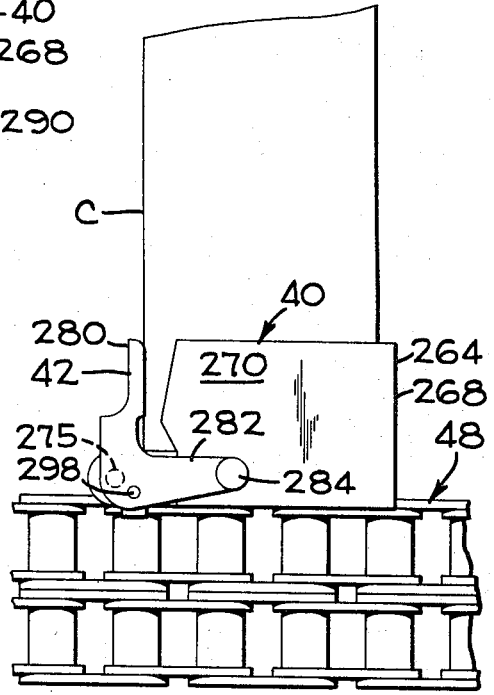

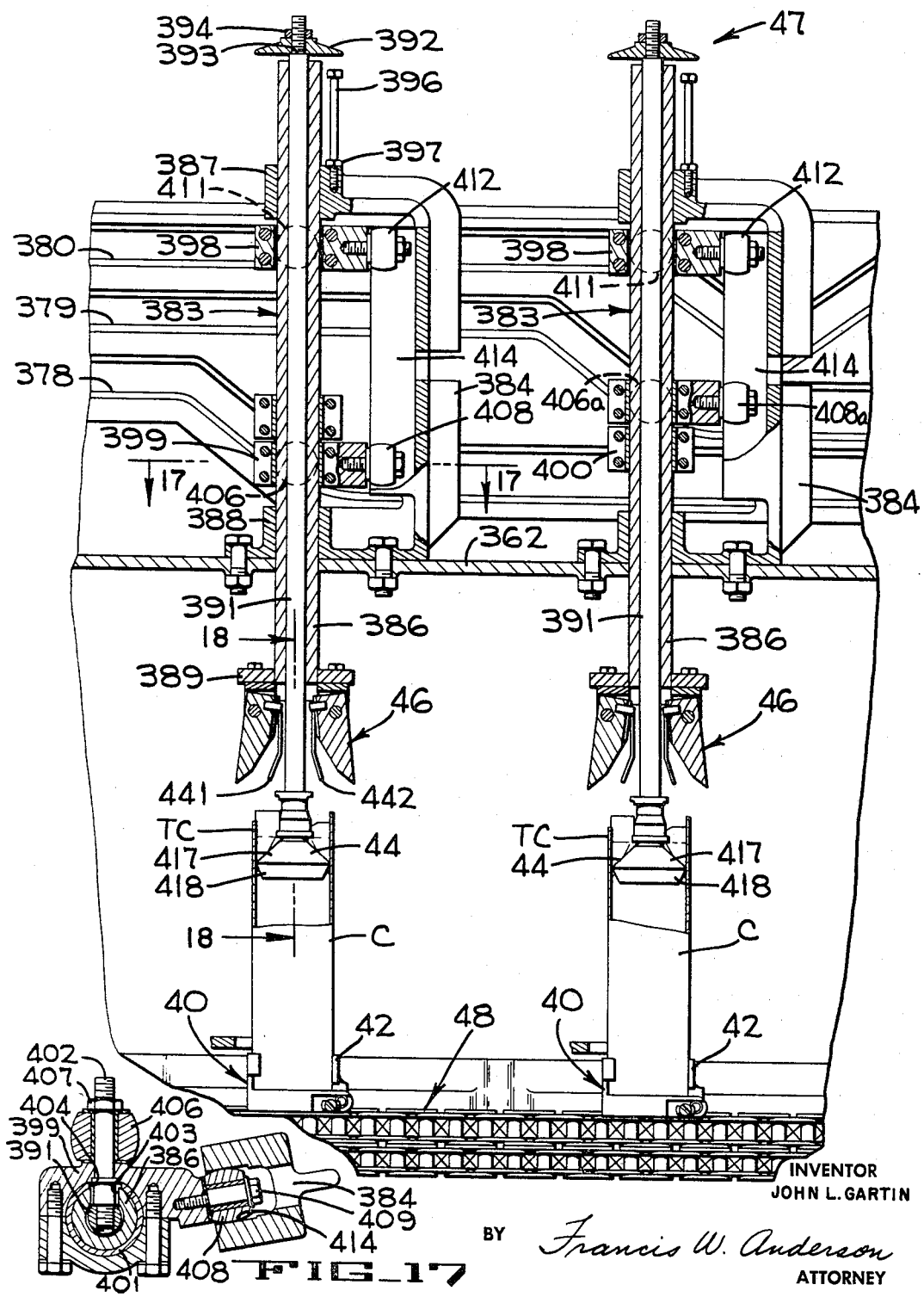

Oct. 1, 1968    J. L. GARTIN    3,403,606
CARTON FEEDING AND FORMING APPARATUS
Filed July 8, 1966    12 Sheets-Sheet 12
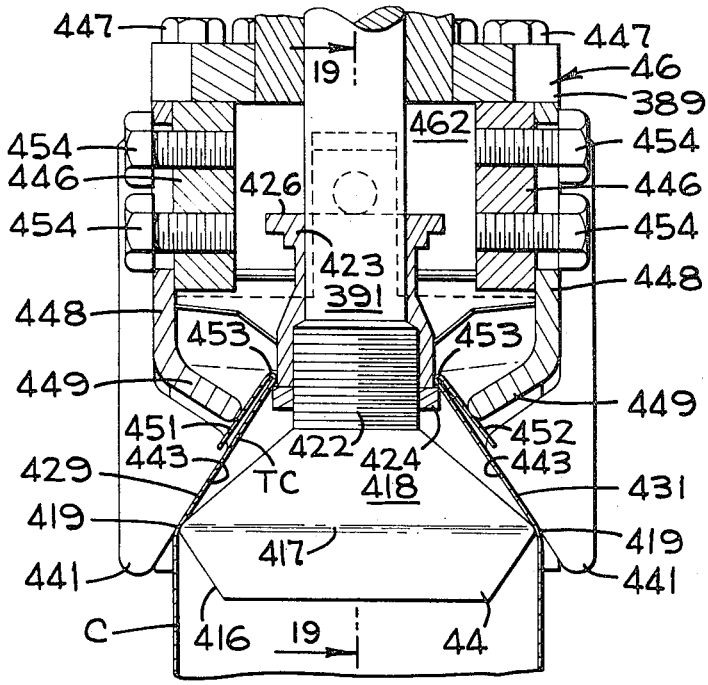
FIG_18
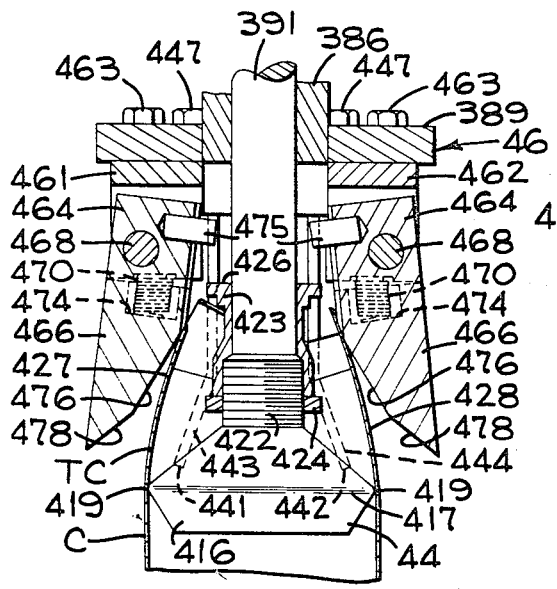
FIG_19
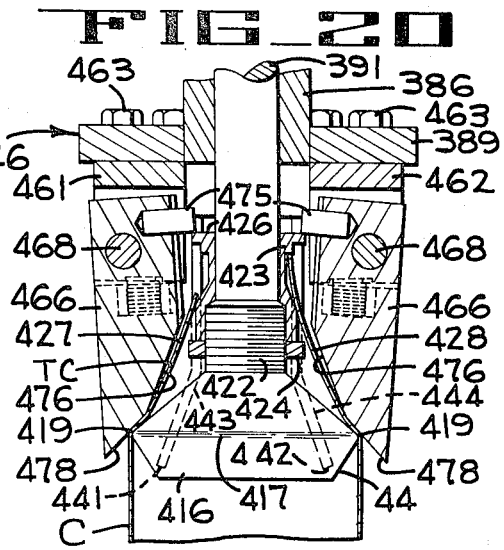
FIG_20
INVENTOR
JOHN L. GARTIN
BY  *Francis W. Anderson*
ATTORNEY

United States Patent Office 3,403,606
Patented Oct. 1, 1968

3,403,606
CARTON FEEDING AND FORMING APPARATUS
John L. Gartin, San Jose, Calif., assignor to
FMC Corporation, San Jose, Calif., a corporation of Delaware
Filed July 8, 1966, Ser. No. 563,860
14 Claims. (Cl. 93—44.1)

ABSTRACT OF THE DISCLOSURE

A carton transfer apparatus includes two turrets for receiving pairs of cartons from two rows of cartons and for sliding the cartons over a dead plate into adjacent carriers having their supporting surfaces at the same elevation as the dead plate. The carriers are moved along a path tangent to both turrets, and each carrier includes a gate which is clamped against the carton therein immediately after the carrier moves away from the point of tangency. Stabilizing means is lowered into each carton shortly after the carton moves away from the tangent point.

---

The present invention pertains to carton forming and filling machines and more particularly relates to an apparatus which receives cartons, transfers the cartons directly into carriers of a single continuously driven conveyor, and preforms the top closure of the cartons while the cartons are gripped by the carriers.

The carton feeding the forming apparatus of the present invention is adapted for use in a carton forming and filling machine of the type disclosed in the copending applications of Leslie Vadas et al., Ser. Nos. 461,738 and 522,285, which applications were filed on June 7, 1965 and Jan. 19, 1966, respectively, and are assigned to the assignee of the present invention. The latter application is now Patent No. 3,305,068 dated Feb. 21, 1967. The forming head disclosed herein is described and claimed per se in an application of Francis J. Hoff, Ser. No. 541,813 which application was filed on Apr. 11, 1966, and is assigned to the assignee of the present invention. The carriers disclosed herein are described and claimed per se in an application of Gartin et al., Ser. No. 563,776, which issued on Nov. 14, 1967 as Patent No. 3,352,405, and are also disclosed in an application of Stevenson et al., Ser. No. 563,875, and in an application of Cimlov, Ser. No. 563,736, which applications are filed on even date herewith and are assigned to the assignee of the present invention.

In the above mentioned later filed Vadas et al. application a carton accumulator is provided which supports two rows of empty cartons having their bottom closures sealed and their top closures open. The cartons in each row are received on a dead plate and are deflected above the path of movement of the carriers by fingers that project outwardly from a pair of transfer turrets, one turret being associated with each row of cartons. Rapidly moving transfer arms of a crimping turret then engage the cartons one at a time and move them along the same arcuate path of the discharge end of the dead plate. Immediately after the cartons are moved off the dead plate, one of a plurality of crimping heads is lowered into the top closure of each carton to push the cartons downwardly into associated carriers. The crimping heads bend certain tabs of the carton outwardly and the cartons are then advanced to another turret which preforms the top closure of the carton.

It has been determined that the reliability of carton transfer can be greatly improved and the crimping and preforming operations can be performed by one turret, rather than two separate turrets, if; the two rows of cartons are transferred directly into the carriers by the associated transfer turrets, the carriers are arranged to firmly grip the cartons and square the top closures thereof, and the stabilizing means are lowered into the top closures of the cartons shortly after they are gripped by the carriers.

It is, therefore, one object of the present invention to provide an improved carton feeding and forming apparatus.

Another object is to provide an apparatus which receives cartons from two rows and reliably transfers the cartons directly into carriers which firmly grip the cartons and square the top closures while advancing the cartons along a single path.

Another object is to provide an improved carton forming turret which includes means for simultaneously introducing stabilizing means into the upper ends of a pair of adjacent cartons.

These and other objects and advantages of the present invention will become apparent from the following description and the accompanying drawings, in which:

FIGURE 1 is a perspective of the carton feeding and forming apparatus of the present invention, the apparatus being adjusted to handle one-half pint cartons.

FIGURE 2 is an end elevation of the carton feeding and forming apparatus when adjusted to handle quart cartons, certain parts of one transfer turret being cut away.

FIGURE 3 is a side elevation of the apparatus shown in FIGURE 1 taken looking in the direction of arrows 3—3 of FIGURE 2, only two forming head assemblies being shown.

FIGURE 4 is an enlarged horizontal section taken substantially along lines 4—4 of FIGURE 3.

FIGURE 5 is a vertical central section of a carton forming turret taken along lines 5—5 of FIGURE 4.

FIGURE 6 is an enlarged horizontal section taken along line 6—6 of FIGURE 3.

FIGURE 7 is an enlarged horizontal section taken substantially along lines 7—7 of FIGURE 5 illustrating a portion of the gate closing mechanism and showing the carriers in phantom.

FIGURE 8 is an arcuate section taken substantially along lines 8—8 of FIGURES 5 and 7 illustrating the carriers in phantom in two operative positions.

FIGURE 9 is an enlarged perspective of one of the carriers with the carton gripping gate being open.

FIGURE 10 is an elevation of a portion of the carrier taken looking in the direction of arrows 10—10 of FIGURE 9.

FIGURE 11 is a plan of one of the carriers with the gate open and illustrating a carton therein with its top closure assuming a diamond shape configuration.

FIGURE 12 is a plan similar to FIGURE 11 but illustrating the gate closed in gripping engagement with the carton to square the top closure of the carton.

FIGURE 13 is a plan of a portion of one of the carriers with parts cut away to illustrate resilient means for maintaining the gate in adjusted position.

FIGURE 14 is a side elevation of one of the carriers with the gate closed and assuming an empty carrier position.

FIGURE 15 is a side elevation of one of the carriers similar to FIGURE 14 but illustrating the gate closed in gripping engagement with a carton in the carrier.

FIGURE 16 is an enlarged arcuate section taken at the transfer station shortly after a pair of cartons have been clamped in associated carriers, said view illustrating a pair of stabilizing mandrels inserted within the open top closures of the cartons.

FIGURE 17 is an enlarged horizontal section taken along lines 17—17 of FIGURE 16.

FIGURE 18 is an enlarged vertical central section taken along lines 18—18 of FIGURE 16 but illustrating the forming head and anvil in carton crimping and forming position.

FIGURE 19 is a section taken along lines 19—19 of FIGURE 18 illustrating a crimping head moving into carton crimping position.

FIGURE 20 is a section similar to FIGURE 19 illustrating the head and mandrel in carton crimping position.

In general, the carton feeding and forming apparatus 20 (FIGS. 1 to 4) of the present invention includes a pair of chutes 22 and 24 which receive cartons C displaced from the lower ends of accumulating guideways 26 and 28, respectively, by pushers 30 and 32, respectively. The cartons which drop from the chutes 22 and 24 are received on a dead plate 34 in position to be engaged by transfer turrets, 36 and 38, respectively. The transfer turrets 36 and 38 slide two cartons at a time over the dead plate 34 directly into two adjacent carriers 40 of a plurality of carriers having pivotal gates 42 thereon when the gates are open. The two carrier gates 42 are then closed to firmly grip the cartons and to maintain the open upper ends of the cartons in a square condition rather than permitting them to be deflected into diamond-shaped configurations due to inherent resilience in the cartons. Shortly thereafter, two conical anvils 44 that are associated with forming heads 46 of a forming turret 47 are simultaneously lowered into the upper ends of the gripped cartons to stabilize the same. The forming heads 46 are thereafter moved downwardly into engagement with the top closure flaps to bend the flaps inwardly. The carriers 40, which are evenly spaced along and are connected to a continuously driven endless conveyor 48, retain their grip on the cartons until after the cartons have been filled and sealed.

Although chutes 22, 24; pushers 30, 32; and transfer turrets 36 and 38 are substantially the same as described in the earlier filed above mentioned Vadas et al. application, these components will be described in detail since they cooperate with the carriers 40 and forming turret 47 to define the carton feeding and forming apparatus of the present invention.

In order to accommodate cartons C of different heights, such as quart, pint, one-third quart, and one-half pint cartons, the dead plate 34 and conveyor 48 are supported by a vertically adjustable frame 50. The adjustable frame 50 is supported by means of a plurality of gear jacks 52 (only one being shown in FIGURE 3) from a stationary frame 54 and may be adjusted by means fully disclosed in the earlier filed aforementioned Vadas et al. application.

The feeding and forming apparatus 20 (FIGS. 1–4) includes the carton deflecting chutes 22 and 24 which are associated with the accumulator guideways 26 and 28, respectively. Each chute comprises a slotted substantially horizontal floor plate 66 disposed below the associated guideways 26 or 28 which acts as a support for the column of cartons in the associated guideway and is formed integrally with a vertical extending rear wall 67. A similarly shaped vertically extending front wall 68 is connected to the rear wall 67 by a vertical side wall 69 and a curved side wall 71. The four walls cooperate to define a carton deflecting passageway 72 (FIG. 4) which guides each carton as it slides down the curved wall 71 to a vertical position with its top closure TC (FIG. 2) uppermost.

The chutes 22 and 24 are bolted to brackets 73 and 74 which are formed integrally on a horizontal, stationary support member 77 of a turret sub-frame 78.

In order to deflect cartons into the deflecting passageways 72 of the chutes 22 and 24, the carton pushers 30 and 32 push the lowermost cartons in the associated guideways 26 or 28 off the floor plates 66 and into the passageways 72 of the respective chutes 22 or 24. Each carton pusher 30 and 32 comprises a double armed bell crank 79 pivoted on a shaft 81 secured to the sub-frame 78 and held from axial movement by collars 82. A pusher foot 83 is bolted to the upper end of each bell crank 79, and downwardly extending links 84 and 86 are pivotally connected to the other end of the bell cranks 79 of pushers 30 and 32, respectively. The lower ends of the links 84 and 86 are slidably received in a block 87 (FIGS. 2, 3 and 6) that is pivoted in a yoke 88 formed on one end of an actuating lever 89 that is pivoted at its other end about a bolt 91 (FIG. 3) which is connected to a bracket 92 secured to the stationary frame 54. Compression springs 93 are disposed around the links 84 and 86 and between the block 87 and collars 94 keyed to the links 84 and 86. Thus, upward movement of the block 87 will normally cause both pushers 30 and 32 to deflect cartons into the associated chutes 22 and 24.

The block 87 is vertically reciprocated in timed relation with the movement of the conveyor 48 by a cam 96 which is splined on the lower end of a vertical cam shaft 97 for rotation therewith and for vertical movement relative thereto. The cam 96 is held from vertical movement between an upper horizontal portion 98 and a lower horizontal portion 99 of the bracket 92. A cam follower 101 (FIG. 3) journaled on the lever 89 engages a cam groove 102 in the cam 96 to cause vertical reciprocation of the block 87 upon rotation of the cam.

In the event the supply of cartons in one or both of the associated accumulator guideways 26 and 28 (FIG. 2) is low as determined by control means described and claimed in the aforementioned earlier filed Vadas et al. application, means are provided for deactivating one or both of the pushers 30 and 32. If the supply of cartons is low in only one of the guideways 26 or 28, it will be understood that the pusher associated therewith will be inactivated while the other pusher operates in a normal manner.

As best shown in FIGURES 2 and 3, bolts 103 and 104 extend through the lower ends of the links 84 and 86, respectively, in positions to be engaged by hooking notches 106. The notches 106 are formed in the upper ends of spaced latching arms 107 and 108 of bell cranks 109 and 111, respectively. The bell cranks are journaled on a shaft 112 that is secured to the lower portion 99 of the bracket 92. The bell crank 109 is pivotally connected to the actuating element 113 of a solenoid 114, which solenoid during normal operation is energized to hold the latching arms 107 out of engagement with the bolts 103 as indicated in FIGURE 3. Similarly, the bell crank 111 (FIG. 2) is pivotally connected to the actuating element 116 of a solenoid 117 which is energized to hold the latching arms 108 out of engagement with the bolt 104 during normal operation of the machine. A normally open cam switch 1CS (FIG. 3) is held closed, and a normally closed cam switch 2CS is held opened by a switch actuating element 120 that is bolted to the block 87 when the parts are in the retracted position indicated in FIGURE 3.

When the supply of cartons is low in one of the accumulator guideways 22 or 28, for example the guideway 26, the solenoid 114 will be de-energized by means disclosed in the aforementioned earlier filed Vadas et al. application thereby causing the latching arms 107 to engage the bolt 103 (FIG. 3) and prevent the link 84 from moving upwardly thereby deactivating the pusher 30. It will be appreciated that the spring 93 will yield to permit the block 87 to be reciprocated in the usual manner by the cam 96 thereby causing the pusher 32 to operate in the normal manner while pusher 30 is held from movement by the latching arms 107.

The cam shaft 97 is rotatably journaled in bearings in horizontal members 121 and 122 (FIGS. 2 and 3), of a vertically movable feed mechanism sub-frame 124. The upper end of the shaft 97 is held from vertical movement relative to the frame 124 by a gear 126 which is secured to the shaft 97 by a setscrew 127 and is disposed between the members 121 and 122. The sub-frame 124 is of generally rectangular configuration and includes vertical side members 128 and 129 rigidly secured to the horizontal member 122 and to an upper horizontal member 130 as indicated in FIGURES 2 and 3. The lower horizontal member 122 is bolted to webs 131 and 132 (FIG. 2) which are integral with and project rearwardly from the movable frame 50. Accordingly, the sub-frame 124 and the components thereon are moved vertically with the movable frame 50 when height adjustments are made to adapt the machine to handle cartons of different sizes.

As indicated previously, cartons C are dropped onto the dead plate 34 from the chutes 22 and 24 in position to be engaged by the transfer turrets 36 and 38, respectively. The transfer turret 36 includes an upper transfer disc 36a and a lower transfer disc 36b of identical peripheral shape. Similarly, the transfer turret 38 includes an upper transfer disc 38a and a lower identically shaped transfer disc 38b. The upper discs 36a and 38a rotate in a fixed horizontal plane whereas the lower discs 36b and 38b are connected to the movable subframe 124 of the adjustable frame 50 for vertical adjustment so as to accommodate cartons of different sizes.

The sub-frame 124 and parts supported thereby are guided for vertical movement by stationary, vertically extending shafts 140 and 142 which define the axes of rotation of the transfer turret 36 and 38, respectively. The lower ends of the shafts 140 and 142 are rigidly secured to hubs 144 only one being shown in FIGS. 2 and 3 which are bolted to the stationary frame 54. The shafts 140 and 142 extend upwardly through bosses 145 in the horizontal frame members 122 and 130, through holes in the dead plate 34, through the transfer discs 36a, 36b and 38a, 38b, respectively, and have their upper ends connected to the stationary support member 77 by cap screws 146 and 148 (FIG. 4) respectively. Thus, the stationary support member 77 of sub-frame 78 is held in fixed position by the shafts 140 and 142 and is of irregular shape as indicated in FIGURE 4.

The lower transfer disc 36b (FIG. 2) is set screwed to the upper end of a tubular shaft 150 which is journaled for rotation and for vertical sliding movement on the stationary shaft 140. The tubular shaft 150 is also journaled in the associated bosses 145 and is keyed and set screwed to the hub of the gear 152 (FIG. 6). Similarly, the lower transfer disc 38b (FIG. 2) is keyed and set screwed to a tubular shaft 160 which is journaled for vertical movement as well as for rotation on the stationary shaft 142 and is journaled for rotation in the associated bosses 145 of frame members 122 and 130. A gear 162 is keyed and set screwed to the tubular shaft 160 as indicated in FIGURE 6. The tubular shafts 150 and 160 are held from vertical movement relative to the movable frame member 130 by collars 164 and 166 which engage the associated bosses 145 on the frame member 130 and are rigidly secured to the tubular shafts 150 and 160, respectively. An idler gear 168 is journaled on a bolt 170 secured to the frame member 130 and meshes with the gears 152 and 162 to assure that the transfer turrets 36 and 38 are driven in timed relation and in the same direction.

The dead plate 34 is bolted to a plurality of upstanding pedestals 172 (FIGS. 2 and 3) which are integral with the upper horizontal member 130 of the movable sub-frame 124. Accordingly, the lower transfer discs 36b and 38b are at all times spaced a predetermined distance above the deadplate 34 so as to engage the lower portions of all sizes of cartons being transferred at equal distances above the lower ends thereof.

The upper transfer discs 36a and 38a are held from vertical movement and the top closures of all sizes of cartons are positioned at a common elevation by suitable adjustment of the adjustable frame 50 thereby making it possible for the transfer turrets 36 and 38 to handle all sizes of cartons by vertically adjusting only the lower discs 36b and 38b. In this regard, the upper transfer disc 36a is journaled on the shaft 140 and is held from vertical adjustment by collars 174 which are set screwed to the shaft 140. Similarly, the upper transfer disc 38a is journaled on the shaft 142 and is held from vertical movement between collars 176 that are set screwed to the shaft 142.

The upper disc 36a is driven from the lower disc 36b by a vertical post 178 which is secured by a cap screw to a hub formed on the disc 36b and which is slidably received in a block 180 connected to the upper transfer disc 36a. Similarly, the upper disc 38a is driven from the lower disc 38b by a vertical post 182 which is secured to a hub formed on the disc 38b and which is slidably received in a block 184 connected to the upper transfer disc 38b. Thus, the posts 178 and 182 permit vertical movement between the transfer disc 36a, 36b and 38a, 38b and drives the upper discs at the same speed as the corresponding lower discs thereby assuring dependable transfer of the cartons by the turrets 36 and 38.

The transfer discs 36a, 36b and 38a, 38b are driven in a clockwise direction, by means to be described hereinafter, as indicated by the arrows A in FIGURE 4 from the continuously driven forming turrent 47 which is driven in a counterclockwise direction as indicated by arrows B. The upper and lower transfer discs of transfer turrent 36 are each provided with three equally spaced outwardly projecting transfer fingers 190. The fingers 190 include carton contacting surfaces 192 which engage the cartons that gravitate onto the dead plate 34 from the chute 22 and advance the cartons along an arcuate path and directly into every second carrier 40 as the carriers move around an arcuate path concentric with the axis of rotation of the forming turret 47. When one of the fingers 190 on each disc 36a and 36b is aligned with an associated carrier 40 as indicated in FIGURE 4, it will be noted that the carton engaging surfaces 192 of the fingers 190, and the carton engaging surfaces of the rear carrier wall lie substantially in a common vertical plane.

In order to guide each carton as it is being transferred from the chute 22 to the associated carriers, the side wall 71 of the chute 22 is provided with a lower stabilizing end 194 (FIGS. 2 and 3) which projects below the plane of the upper transfer disc 36a and engages the upper portion of one of said cartons. A frusto-conical ring 196 is bolted to the lower risc 36b and cooperates with the stabilizing end 194 of the chute 22 to guide the carton onto the dead plate 34 in position to be engaged by a pair of coplanar upper and lower fingers 190 of the transfer turret 36. When the fingers 190 are moving the carton along its arcuate path, the carton is guided by an upper arcuate rail 198 and a lower arcuate rail 200. The upper rail 198 is bolted to brackets 202, 204 and 206 that are bolted to the stationary support member 77 thereby supporting the upper rail in fixed position. The lower rail 200 is concentric with the upper rail 198 and is supported by the dead plate 34 by bolts 208 and cooperating spacers 210.

To assure proper seating of the carton in the associated carrier 40, three cam segments 212 (FIG. 4) are bolted to each transfer disc 36a, 36b with a segment being disposed adjacent each transfer finger 190 so as to move the carton outwardly away from the conical ring 196 when the carton contacting surface 192 of the finger 190 engages the carton.

As mentioned above the turret 36 transfers cartons from the chute 22 into position to enter alternate ones of the carriers 40. The transfer turret 38 serves to transfer the cartons from the chute 24 into position to enter the remaining carriers 40.

Whereas the turret 36 includes three sets of coplanar transfer fingers 190 (FIG. 4) on each disc, each transfer disc 38a and 38b of the turret 38 includes only two fingers 230. The fingers 230 receive cartons from the chute 24, which cartons are guided upon the dead plate 34, by a frusto-conical ring 196a that is slightly smaller than the ring 196, and are advanced in a clockwise direction (FIG. 4) along an arcuate path. The cartons transferred by turret 38 are guided by an upper stationary arcuate rail 232, and a vertically adjustable lower arcuate rail 234. The rails 232 and 234 are supported in a manner similar to the rails 198 and 200, respectively, of transfer turret 36 and guide the cartons into alternate ones of the carriers 40.

The carriers 40 receive the cartons directly from the transfer turrets 36 and 38 and are connected at evenly spaced intervals on the conveyor 48 as mentioned above. The conveyor 48 is continuously driven and is trained around a plurality of sprockets including a sprocket 244 (FIG. 5) that is bolted to a drive hub 245 mounted on a tubular column 245a for rotation about a stationary post 246 of the forming turret 47. As the conveyor 48 moves around the sprocket 244, the carriers 40 with their pivotal gates 42 open move into positions to receive cartons from the transfer turrets 36 and 38. The carrier gates 42 are then closed by a gate closing mechanism 252 which mechanism is associated with the forming turret 47. Closing the gates against the associated cartons grips the cartons in the carriers and also holds the top closures of each carton in a squared condition rather than permitting the top closure to assume a diamond-shaped configuration due to inherent resilience in the carton.

Each carrier 40 comprises a main body 264 (FIGS. 9–15) having a pair of attachment pins (not shown) welded thereto and projecting downwardly therefrom for acceptance by the chain of the conveyor 48. The body 264 includes a rear upstanding wall 268, a side upstanding wall 270, and a carton squaring corner abutment 272 disposed on the upper portion of the free end of the rear wall 268. The corner abutment 272 includes a vertical surface which flares outwardly at an angle of 45° from the vertical carton engaging plane of the rear wall and is arranged to engage one upstanding edge of the carton.

Each carrier body 264 has one of the gates 42 pivotally connected thereto by means of a pivot pin 275 which extends through ears 276 and 277 formed in the body 264 and through a tongue 278 of the gate 42. The pivot pin 275 is locked in position by a screw 279 (FIG. 10) which is screwed into the ear 276. Each gate 42 includes an upstanding front or gate wall 280 which is integral with the tongue and with an actuating arm 282, which arm 282 extends rearwardly adjacent the side wall 270. The arm has a trip pin 284 on its rear end which projects transversely outward therefrom. The upstanding wall of the gate 42 is relieved adjacent its lower edge so as to apply its gripping force against the carton at a point above its sealed bottom closure.

The gate 42 is arranged to assume three separate positions; an open position with the front or gate wall 280 horizontal and the trip pin 284 in an elevated position, as indicated in FIGURE 9, a carton gripping and squaring position with the front wall substantially vertical and the trip pin at an intermediate elevation, as indicated in FIGURE 15, and an empty carrier positioned with the front wall angled rearwardly and the trip pin at a lowermost position as indicated in FIGURE 14. The gate 42 is selectively held in the above positions by a spring 286 (FIG. 13) which is received in a bore 288 in the body 264 and has one end thereof abutting a screw 290 screwed into the bore and has its other end abutting one end of an over-center lock plunger 292. The other end of the over-center lock plunger 292 abuts a block 296 that is pivoted on a pin 298 secured to the actuating arm 282 at a point which is eccentric relative to the pivot bolt 275. The spring is of sufficient strength to maintain the gate 42 in adjusted position.

A feature of the invention is that the gate 42 when closed against the carton not only firmly grips the carton but also cooperates with the corner abutment 272 to square the upper end of the carton, which upper end or top disclosure would otherwise assume a diamond-shaped configuration due to the resilience in the carton body which tends to return the carton body to a flat folded condition.

As the conveyor 48 begins moving each empty carrier 40 around the forming turret 47, each carrier gate 42 is open, and accordingly, the trip pin 284 is in its uppermost position. The trip pin 284 of each gate 42 is disposed immediately adjacent the free end of an associated one of a plurality of gate actuating arms 300 (FIGS. 4, 5, 7 and 8) of the gate closing mechanism 252. Each arm 300 is rigidly secured as by bolting to the upper end of either a long pivot shaft 301 or a short pivot shaft 302, each of the pivot shafts being received in a pair of spaced ears 303 secured to and projecting outwardly from the drive hub 245. The shafts 301 and 302 are evenly spaced around the turret 47, and each long shaft 301 is interposed between a pair of short shafts 302 with the long shafts projecting downwardly a greater distance than the short shafts. A cam arm 304 having a cam follower 305 journaled on its free end, is belted to the lower end of each long shaft 301 and projects outwardly therefrom, and a similar cam arm 306 having a cam follower 307 journaled on its free end, is bolted to the lower end of each short shaft and projects outwardly therefrom. As best shown in FIGURES 7 and 8, a plurality of tension springs 308 are provided, and each spring is secured between an associated cam arm and one of a plurality of ears 308a rigid with the drive hub 245 so as to normally urge the gate actuating arms 300 in counterclockwise direction (FIGS. 4 and 7) against adjustable stop bolts 309 secured to the drive hub 245.

When a pair of empty carriers 40 enters a carton receiving station 310, the associated cam arm 306 (FIGS. 7 and 8) of the short shaft 302 moves above and past a short trip device 312 without contacting the same and approaches a second or tall trip device 314. The trip device 312 comprises a bracket 316 bolted to a stationary annular support 317 to which a bell crank 318 is pivotally connected by a shouldered bolt 319. The bell crank includes a short upstanding trip arm 320 and a spring attachment arm 321 to which one end of the spring 322 is connected. The other end of the spring 322 is connected to the annular support 317 and normally holds the trip arm 320 in a vertical position. The spring 322 is provided so as to permit the finger 320 to pivot downwardly in a counterclockwise direction (FIG. 8) in the event the direction of movement of the conveyor 48 is reversed, during adjustment or maintenance of the machine, thus permitting the carrier gate trip pins 284 to move therepast without injury to the gate closing mechanism 252 or to the trip devices 312 and 314.

The tall trip device 314 is identical to the first trip device 312 except that the trip finger 320a of the second device is longer than the finger 320. The trip devices 312 and 314 are spaced apart a distance which will cause the cam rollers 307 to engage the trip arm 320a simultaneously as the cam roller 305 engages the trip arm 320. Thus, the carriers trip pins 284 (FIG. 4) of the gates 42 of the two carriers positioned at the carton receiving station 310 will be engaged and pivoted to the phantom line position at the same time thereby closing both gates simultaneously, whether or not each carrier is filled with a carton.

Shortly after each pair of cartons received from the transfer turrets 36 and 38 has been clamped in their carriers 40, a pair of anvils 44 of the forming turret 47 are simultaneously lowered into the top closure of the cartons to stabilize the same. After the anvils 44 enter the top closures of the pair of cartons, the forming heads 46 disposed above the cartons are cammed downwardly to perform the double function of bending the top closure flaps of the carton inwardly and crimping opposed tabs of the top closure outwardly.

The forming turret comprises the aforementioned stationary post or column 246 (FIG. 5) which is bolted to the stationary frame 54. The drive hub 245 is mounted for vertical sliding movement relative to and for rotation with the tubular drive column 245a that is journaled by bearings 345 and 346 on the stationary column 246. The sprocket 244, a splash apron 351, a gear 352 which meshes with the gear 152 (FIG. 6), and a gear 353 which meshes with the gear 126 are bolted to the drive hub 245 thus driving the turret 36, 38 and 47, and the pushers 30 and 32 in timed relation.

The drive hub 245 (FIG. 5) is supported on the adjustable frame 50 for movement therewith by the annular support 317 which is bolted to the adjustable frame 50 and has the stationary column 246 and tubular column 245a projecting upwardly therethrough. A pair of mating thrust bearings 357 and 358 are connected to a flange on the lower end of the drive hub 242 and to the annular support 317, respectively, thereby permitting rotation of the hub 245 relative to the annular support 317.

A tool supporting hub 362 is bolted to the upper end of the turret drive column 245a and has an upwardly projecting neck 363 rotatably received about a reduced diameter portion 364 of the stationary column 246. A vertically extending drive post 365 is bolted to the drive hub 245 and projects upwardly through a suitably bushed drive block 362a that is rigidly secured to the tool supporting hub 362. It will be recognized that the drive post 365 transmits rotary motion from the drive hub 245 to the tool supporting hub 362 yet permits vertical motion of the drive hub 245 and associated parts relative to the tool supporting hub 362.

A non-rotatable cam supporting hub 366 is keyed to the reduced diameter portion 364 of the stationary column 246 and has a threaded counterbore in its upper end which receives the threaded body 367 of a height adjustment bushing 368. The bushing 368 includes a small diameter bore journaled on a small diameter portion 371 of the stationary column 246, and a large diameter bore journaled on the portion 364 of the stationary column. A handle 373 screwed into the bushing 368 provides means for rotating the bushing and therefore raising or lowering the cam supporting hub 366 to the desired elevation. The cam supporting hub 366 is locked at the desired elevation by threaded collar 374 which is screwed into the small diameter portion 371 of the stationary column 246. A handle 376 is secured to the collar 374 to provide means for readily locking the collar 374 against the bushing 368.

An annular cam 377 having a lower continuous annular track 378, an intermediate annular track 379, and an upper annular track 380 is bolted to the cam supporting hub 366 and causes vertical reciprocation of the conical anvils 44 and vertical reciprocation of the top forming heads 46 of each of a plurality of forming head assemblies 383 in timed relation with the movement of the turret 47.

In the preferred embodiment of the invention the top forming turret 47 comprises six forming head assemblies 383 which are equally spaced around the turret, and each assembly 383 includes one of the conical anvils 44 and one of the forming heads 46. Since all of the assemblies 383 are substantially the same, only one assembly will be described in detail.

Each forming head assembly 383 (FIG. 16) comprises a C-shaped sub-frame 384 which is bolted to the tool supporting hub 362 and slidably receives a vertically extending tubular shaft 386 in an upper hub 387 and in a lower hub 388. A forming head support plate 389 of the forming head support 46 is welded to the lower end of the tubular shaft 386 thereby supporting the forming head for movement with the shaft. A vertically extended anvil supporting rod 391 is slidably received in the tubular shaft 386 and has the conical anvil 44 secured to its lower end. An abutment collar 392 is clamped against the shoulder 393 adjacent the upper end of the rod 391 by a nut 394 screwed on the rod. The collar 392 is disposed in position to engage the upper end of a stop screw 396 which is screwed into the upper hub 387, and is locked in adjusted position by a locknut 397.

In order to vertically reciprocate the shaft 386 and rod 391, and to prevent rotation of the same relative to the C-shaped sub-frame 384, a split block 398 is clamped to the tubular shaft 386 of each forming head assembly 383, and low split blocks 399 are clamped to alternate ones of the rods 391 while identical high split blocks 400 are clamped to the other rods 391. As indicated in FIGURE 17, the split block 399 is clamped to a sleeve 401 which is slidably received on the outer surface of the associated tubular shaft 386. A shouldered lug 402 is screwed into the associated rod 391 and extends through a vertical slot 403 in the tubular shaft 386, through an opening 404 in the sleeve 401, and through an opening in the split block 399. A cam follower 406 is journaled on the lug 402 and is held in place by a nut 407. A cam follower 408 is disposed at substantially 90° relative to the follower 406 and is journaled on a capscrew 409 screwed into the split block 399. Similar cam followers 406a and 408a are journalled on the split block 400 while cam followers 411 and 412 are journaled on cap screws secured to the split block 398. During rotation of the forming turret 47, the cam followers 411 (FIG. 16) ride along the upper annular cam track 380, the cam followers 406 ride along the lower cam track 378, and the cam followers 406a ride along the intermediate cam track 379 thereby vertically reciprocating the forming heads 46 and the anvils 44 in timed relation with the movement of the forming turret 47. The cam followers 408 and 412 and 408a are received in a vertical cam track 414 formed in the sub-frame 384 and serve to hold the rod 391 and the tubular shaft 386 of each forming head 383 from rotation relative to the sub-frame.

The conical anvil 44 (FIG. 18) of each assembly comprises a lower frusto-conical lead-in portion 416 which aids in guiding the anvil into the open top closure TC of the carton C. The lead-in portion 416 is connected at a circumferential fulcrum edge 417 to an upper frusto-conical back-up portion 418 which is secured to the rod 391 as by welding. As indicated in FIGURES 18 to 20, when the conical anvil 44 is in its active position, the circumferential fulcrum edge 417 is disposed opposite the horizontal closure score lines 419 formed on the rectangular periphery of the carton. The score lines 419 connect the flaps of the top closure TC to the body of the carton. Since the anvil 44 is circular in cross-section and since the carton is square in cross-section, it will be appreciated that there will be little difficulty in inserting the anvil 44 into the carton even if the carton is slightly misaligned, and that the circumferential fulcrum edge 417 will engage the carton only at the tangential points of the four walls.

The anvil 44 also includes a threaded shank 422 which has abutment cam 423 screwed thereon and locked in place by locknuts 424. As will be made apparent hereinafter, the upper surface 426 of the abutment cam 423 cooperates with the forming head 46 to cause the inward folding of opposed flat flaps 427 and 428 (FIGS. 19 and 20) only after the opposed trapezoidal flaps 429 and 431 (FIG. 18) have been bent inwardly.

The top forming head 46 comprises the above mentioned forming head support plate 389 which is welded to the tubular shaft 386. Two sets of spaced fingers 441 and 442 (FIGS. 19 and 20) having downwardly and outwardly flaring carton folding surfaces 443 and 444 as viewed in FIGURE 19, which surfaces also flare downwardly and outwardly as viewed in FIGURE 18, are provided for folding each trapezoidal flap 429 and 431 inwardly upon downward movement of the head 46. Each set of fingers 441 and 442 is welded to a support block 446 (FIG. 18) which is rigidly connected by cap screws 447 to the plate 389. The upper portion of each block 446 is centrally slotted to receive the upper end of a tab bending finger 448 having an inwardly bent tab bending portion 449 which upon downward movement of the forming head 46 engages the associated carton tabs 451 or 452 and bends or crimps the tabs sharply inward about their scored fulcrum points 453 which rests against the nut 424 as indicated in FIGURE 18. Each tab bending finger 448 is secured to the associated block 446 by cap screws 454 which extend through a vertical slot in the fingers 448 and are screwed into the block 446. Thus, downward movement of the head 46 causes the fingers 441 and 442 to bend the trapezoidal flaps 429 and 431 inwardly, and also causes the fingers 448 to bend the tabs 452 outwardly as indicated in FIGURE 18.

The forming head 46 also includes a pair of yokes 461 and 462 (FIGS. 1, 19 and 20) that are rigidly secured to opposite sides of the plate 389 by cap screws 463. Each yoke has a centrally disposed slot which receives a tongue 464 (FIG. 11) of a side flap folding jaw 466. Each jaw 466 is pivoted to its associated yoke by a pin 468 which is journaled in the yoke and is rigidly secured to the associated tongues 464 as by pinning. A pair of compression springs 470 are disposed between each yoke and each jaw 466 and are seated in aligned counterbores 474 in the associated yoke and jaw, and normally urge the jaws to their open position illustrated in FIGURE 19. The jaws 466 are not moved inwardly to the flap folding position illustrated in FIGURE 20 until after the forming head 46 has been moved downwardly a sufficient distance to first bend the trapezoidal flaps inwardly and to enable a pin 475 secured to and projecting inwardly from the tongue 464 of each jaw 466 to engage the upper surface 426 of the abutment cam 423. At this time the jaws 466, which jaws include converging flap folding surfaces 476 and sharply beveled flap crimping surfaces 478, to swing radially inwardly about the axes of their pivot pins 468 thereby forcing the scoreline 419 of the carton against the circumferential edge 417 of the anvil 44 to crimp the same.

It will be particularly noted that the crimping and flap folding force is supplied by the arcuate inward movement of the crimping surfaces 478, rather than by a downward sliding movement of the jaws 466 relative to the anvil 44. It has been determined that such arcuate movement provides a superior crimping action as compared to the crimping action achieved by downward movement of the forming head alone.

Although the anvil 44 is circular, it will be appreciated that the additional structural strength near the corners of the square cartons is sufficient to resist inward deflection of the carton body during the forming operation. Thus, it is apparent the carton flaps are inwardly bent and are crimped at the mid points of their score lines 419, and that these flaps will freely bend about the remaining portions of the score lines.

During operation of the forming turret 47 (FIGS. 5 and 16) the cam tracks 378, 379, and 380 first cause the anvils 44 of a pair of adjacent forming head assemblies to simultaneously move from the inactive position illustrated at the right in FIGURE 5 to an active position within the carton with their circumferential edges 417 lying in a common plane with a horizontal closure score lines 418 substantially as indicated in FIGURE 16. The forming head 46 associated with each forming head assembly 383 is thereafter independently moved downwardly by the cam track 380 from its raised position illustrated in FIGURE 16 until the two pairs of flap bending fingers 441 and 442 of each head engage the associated trapezoidal flaps 429 and 431 (FIG. 18) and bend them inwardly. Continued downward movement of each forming head 46 causes the pins 475 to engage the upper surface 426 of the abutment cam 423 thereby causing the jaws to pivot about their supporting pins 468 from the position illustrated in FIGURE 19 to the position illustrated in FIGURE 20. The swinging movement of the jaws 466, as contrasted to a downward sliding movement of the jaws relative to the stationary anvil 44, substantially eliminates any tendency of the carton to slide downwardly relative to the anvil upon being contacted by the forming head 46 and accordingly alleviates any danger of the bending of the flaps to occur at any point other than at the horizontal score lines 419. The fact that the crimping force applied by the pivotal jaws 466 is directed tangentially at the circumferential edge 417 of the anvil 44, rather than being applied as a downwardly sliding action relative to the stationary anvil 44, also assures that a much sharper crimping action will occur at the closure score lines of the flaps. Thus the arcuate crimping action eliminates all tendencies of the jaws 466 to slide over the outer surfaces of the flaps 427 and 428 thereby reducing marring of these flaps to a minimum.

From the foregoing description will be apparent that the carton feeding and forming apparatus of the present invention includes transfer turrets which simultaneously transfer two rows of cartons directly to spaced carriers on a single conveyor for movement along a single path. The carriers include gates which are simultaneously closed to clamp the cartons from both rows therein and to square the top closures thereof. The apparatus also includes a forming turret which carries a plurality of anvils that are lowered in pairs into the top closures of each associated pair of cartons immediately after the cartons have been clamped in the associated carriers thereby stabilizing the upper ends of the cartons.

While one embodiment of the present invention has been shown and described, it will be understood that various changes and modifications may be made therein without departing from the spirit of the invention or the scope of the appended claims.

The present invention and the manner in which the same is to be used having thus been described, what is claimed as new and desired to be protected by Letters Patent is:

1. A carton feeding and forming apparatus comprising a dead plate, rotary transfer means above said dead plate, carton supply means for placing cartons on said dead plate in position to be received by said transfer means for movement thereby along a first arcuate path, a continuously driven conveyor movable along a second arcuate path tangent to said first path, a carrier on said conveyor having a carton receiving floor disposed at the same elevation as said dead plate, a pair of walls secured to said carrier and projecting upwardly from said floor, a gate pivotally connected to said carrier and movable between an open carton receiving position and a closed carton gripping position, said rotary transfer means adapted to move a carton into said carrier at the point of tangency of said first and said second paths, means for timing the movement of said rotary transfer means and said conveyor, and means for closing said gate to grip the carton therein immediately after the carrier moves away from said point of tangency.

2. An apparatus according to claim 1 wherein a plurality of carriers are mounted at equally spaced intervals along said conveyor, said rotary transfer means including first transfer and second transfer turrets rotating in the same direction, said carton supply means being arranged to simultaneously place a first carton in position to be engaged by said first turret and a second carton in position to be engaged by said second turret, said first transfer turret and said second transfer turret arranged to move said first and second cartons along different arcuate paths that are tangent to said second path, said transfer turrets arranged to simultaneously move the cartons off the dead plate into adjacent carriers, and said gate closing means including means for simultaneously closing the gates of said adjacent carriers.

3. An apparatus according to claim 1 and additionally comprising a forming turret driven at the same speed as said conveyor and concentric with the arcuate path of said conveyor, stabilizing means carried by said forming turret and disposed above and in alignment with said carrier, and means for lowering said stabilizing means into the upper open end of the carton shortly after the carton is clamped in the carrier by said gate.

4. An apparatus according to claim 2 and additionally comprising a forming turret driven at the same speed as said conveyor and concentric with the arcuate path of said conveyor, a plurality of stabilizing means carried by said forming turret with each stabilizing means disposed above and in vertical alignment with associated ones of said carriers as the carriers move around said second path, and means for simultaneously lowering a pair of said stabilizing means into the upper open ends of said first and second cartons clamped in adjacent carriers immediately after said carriers leave the points of tangency thereby stabilizing the upper ends of the cartons.

5. An apparatus according to claim 3 wherein a forming head is carried by said forming turret in alignment with said carrier when moving around said second arcuate path, and means are provided for reciprocating said forming head into engagement with the flaps of the top closure of the carton after the stabilizing means has been lowered into the carton.

6. An apparatus according to claim 4 wherein a plurality of forming heads are carried by said forming turret in alignment with associated ones of said carriers when moving around said second arcuate path, and means are provided for reciprocating each of said forming heads into engagement with the flaps of the top closures of the cartons in the associated carrier after the stabilizing means have been lowered into the cartons.

7. An apparatus according to claim 5 wherein said stabilizing means is an anvil having a frusto-conical lower surface and a frusto-conical upper surface communicating at a circular peripheral edge, and wherein said peripheral edge engages the carton wall at score lines therein thereby aiding in achieveing a sharp bend of the flaps at the score line.

8. An apparatus according to claim 3 wherein each of said forming heads include a pair of pivotal flap folding walls, resilient means normally urging said walls outwardly away from the carton, cam means rigid with said stabilizing means, and means operatively interconnecting said walls to said cam means for closing said walls in crimping engagement with adjacent carton walls immediately before said forming head reaches its lowermost position.

9. An apparatus according to claim 8 wherein the top closure of the carton includes tabs and said forming head includes means for bending the tabs outwardly when the flaps are being bent inwardly.

10. An apparatus according to claim 1 wherein inherent resilience in the carton tends to cause the top closure to deflect out of a squared condition and into a diamond-shaped configuration, and wherein said two walls of said carrier are disposed normal to each other with one wall being opposed to said gate and having a vertical edge, an abutment block secured to said edge and having a carton engaging abutment surface flaring outwardly at an acute angle relative to said one wall, and resilient means for holding said gate closed against said carton, said gate having a carton engaging surface opposed to said abutment surface which is relieved adjacent its lower end thereby applying a greater force at its upper surface as compared to its lower surface against the carton when the gate is closed urging the carton against said abutment surface to square the carton.

11. An apparatus according to claim 10 wherein means are provided to selectively open and close said gate, over-center lock means is supported by said carriers and is disposed in abutting engagement with said gate, and said resilient means urges said over-center lock means against said gate whereby said gate is retained in selective positions of adjustment.

12. An apparatus according to claim 3 wherein means are provided to selectively open and close said gate, over-center lock means is supported by said carrier and is disposed in abutting engagement with said gate, and said resilient means urges said abutment means against said gate whereby said gate is retained in selective positions of adjustment.

13. An apparatus according to claim 12 and additionally comprising an arm integral with and projecting upwardly from said gate when the gate is open, a trip pin projecting transversely outwardly from said arm, a pivot shaft journaled on said forming turret for movement therewith, a pin actuating arm secured to said shaft in position to be deflected into engagement with said trip pin when said gate is open, a cam arm secured to the other end of said shaft and projecting outwardly therefrom, and abutment means disposed in the path of movement of said cam arm for engaging said cam arm as the cam arm moves therepast thereby pivoting said shaft and pin actuating arm causing said pin actuating arm to engage said pin and close said gate.

14. An apparatus according to claim 13 wherein said abutment means includes a stationary bracket, an abutment bar pivotally supported by said bracket and held in vertical position from movement in the direction of movement of said carriers, resilient means connected to said abutment bar for normally holding said abutment pin in said vertical position and adapted to yield in the event said forming turret is moved in a reverse direction permitting said abutment bar to move out of the path of movement of said cam arm.

References Cited

UNITED STATES PATENTS 3,153,374  10/1964  Borkmann et al. _____ 93—44.1
3,249,025   5/1966  Monroe et al. _____ 93—44.1

BERNARD STICKNEY, *Primary Examiner.*